US009215745B1

(12) United States Patent
Dunsbergen et al.

(10) Patent No.: US 9,215,745 B1
(45) Date of Patent: *Dec. 15, 2015

(54) NETWORK-BASED CONTROL OF STATIONS IN A WIRELESS COMMUNICATION NETWORK

(75) Inventors: Berend Dunsbergen, San Jose, CA (US); Anand P. Poomagame, Sunnyvale, CA (US)

(73) Assignee: MERU NETWORKS, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/035,925

(22) Filed: Feb. 22, 2008

Related U.S. Application Data

(63) Continuation-in-part of application No. 11/715,287, filed on Mar. 7, 2007, now Pat. No. 7,826,426, which is a continuation of application No. 11/298,864, filed on Dec. 9, 2005, now abandoned.

(51) Int. Cl.
*H04W 4/00* (2009.01)
*H04W 84/12* (2009.01)
*H04W 36/38* (2009.01)

(52) U.S. Cl.
CPC .............. *H04W 84/12* (2013.01); *H04W 36/38* (2013.01)

(58) Field of Classification Search
CPC ............ H04W 36/00; H04W 36/0011; H04W 36/0083; H04W 84/12; H04W 88/08; H04W 92/20; H04W 36/38; H04L 12/4641; H04L 63/0272
USPC .......................................... 370/328, 338, 331
See application file for complete search history.

(56) References Cited

U.S. PATENT DOCUMENTS

| 3,956,749 A | 5/1976 | Magorian |
| 5,038,151 A | 8/1991 | Kaminski |

(Continued)

FOREIGN PATENT DOCUMENTS

| JP | 2005311580 | 11/2005 |
| JP | 2006229972 | 8/2006 |

OTHER PUBLICATIONS

"Information technology—Telecommunications and information exchange between systems—Local and metropolitan area networks—Specific requirements—Part 11: Wireless LAN Medium Access Control (MAC) and Physical Layer (PHY) Specifications," ANSI/IEEE Std 802.11, 1999 Edition (R2003), vol., no., pp. i-513, 2003.*

(Continued)

*Primary Examiner* — Anthony Addy
*Assistant Examiner* — Marcus Hammonds
(74) *Attorney, Agent, or Firm* — Law Office of Dorian Cartwright; Dorian Cartwright

(57) ABSTRACT

Using the feature named "KEY_SEARCH_AD1" in the Atheros 11n chipset, an access point can determine whether to send an ACK packet in response to a message packet in response to whether the BSSID present in the sender address is present in the keycache. The AP can maintain a list of about 128 arbitrarily selected BSSID's, to each of which it will respond with an ACK packet if it receives a message from a mobile station with that BSSID. (1) the number of mobile stations that can be assigned to that AP is relatively greater. (2) the selection of those BSSID's is no longer constrained by having to match the AP's BSSID using a mask. With selection of those BSSID's being no longer so constrained, it is easier to assign BSSID's to mobile stations while allowing those mobile stations to roam among multiple AP's.

11 Claims, 3 Drawing Sheets

(56) References Cited

U.S. PATENT DOCUMENTS

| | | | |
|---|---|---|---|
| 5,125,108 A | 6/1992 | Talwar | |
| 5,177,788 A | 1/1993 | Schanning et al. | |
| 5,337,397 A | 8/1994 | Lebby et al. | |
| 5,519,706 A | 5/1996 | Bantz et al. | |
| 5,966,094 A | 10/1999 | Ward et al. | |
| 6,023,621 A | 2/2000 | Jackson et al. | |
| 6,658,047 B1 | 12/2003 | Komulainen et al. | |
| 6,721,334 B1 | 4/2004 | Ketcham | |
| 6,728,603 B2 | 4/2004 | Pruzan et al. | |
| 6,760,318 B1 | 7/2004 | Bims | |
| 6,788,658 B1* | 9/2004 | Bims | 370/328 |
| 6,839,038 B2 | 1/2005 | Weinstein | |
| 6,877,043 B2 | 4/2005 | Mallory et al. | |
| 6,894,649 B2 | 5/2005 | Ostervall | |
| 6,933,909 B2 | 8/2005 | Theobold | |
| 6,950,629 B2 | 9/2005 | Nagy | |
| 6,954,177 B2 | 10/2005 | Channabasappa et al. | |
| 6,978,158 B2 | 12/2005 | Ghavami | |
| 6,999,802 B2 | 2/2006 | Kim | |
| 7,057,566 B2 | 6/2006 | Theobold | |
| 7,171,215 B2 | 1/2007 | Khouaja et al. | |
| 7,194,008 B2 | 3/2007 | Chu et al. | |
| 7,197,308 B2 | 3/2007 | Singhal et al. | |
| 7,277,728 B1 | 10/2007 | Kauhanen | |
| 7,319,685 B2 | 1/2008 | Kim et al. | |
| 7,321,580 B1* | 1/2008 | Ramanathan et al. | 370/339 |
| 7,333,455 B1 | 2/2008 | Bolt et al. | |
| 7,359,362 B2 | 4/2008 | King et al. | |
| 7,379,435 B1* | 5/2008 | Kinder | 370/324 |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,420,942 B2 | 9/2008 | Wang | |
| 7,426,388 B1 | 9/2008 | Wright et al. | |
| 7,430,397 B2 | 9/2008 | Suda et al. | |
| 7,433,722 B2 | 10/2008 | Sakamoto et al. | |
| 7,444,425 B2 | 10/2008 | Lehmann, Jr. et al. | |
| 7,466,981 B1 | 12/2008 | Abdelhamid et al. | |
| 7,499,673 B2 | 3/2009 | Saliga et al. | |
| 7,515,909 B2 | 4/2009 | Jain et al. | |
| 7,555,287 B1 | 6/2009 | Heinonen et al. | |
| 7,630,402 B2 | 12/2009 | Un et al. | |
| 7,630,403 B2 | 12/2009 | Ho et al. | |
| 7,693,513 B2 | 4/2010 | Chou | |
| 7,826,426 B1 | 11/2010 | Bharghavan et al. | |
| 7,843,910 B2 | 11/2010 | Loughran et al. | |
| 7,996,554 B1* | 8/2011 | Venkatraman | 709/232 |
| 8,027,637 B1 | 9/2011 | Bims | |
| 8,090,374 B2 | 1/2012 | Rezvani et al. | |
| 8,472,359 B2 | 6/2013 | Bharghavan et al. | |
| 8,787,309 B1 | 7/2014 | Bharghavan et al. | |
| 2002/0022483 A1* | 2/2002 | Thompson et al. | 455/439 |
| 2002/0060995 A1 | 5/2002 | Cervello et al. | |
| 2002/0086640 A1 | 7/2002 | Belcher et al. | |
| 2002/0112008 A1 | 8/2002 | Christenson et al. | |
| 2002/0147031 A1 | 10/2002 | Hood | |
| 2002/0181629 A1 | 12/2002 | Shibata | |
| 2003/0162546 A1 | 8/2003 | Jordan | |
| 2003/0198305 A1 | 10/2003 | Taylor et al. | |
| 2003/0199247 A1 | 10/2003 | Striemer | |
| 2003/0206532 A1* | 11/2003 | Shpak | 370/322 |
| 2003/0206535 A1* | 11/2003 | Shpak | 370/328 |
| 2003/0207697 A1* | 11/2003 | Shpak | 455/524 |
| 2003/0207698 A1* | 11/2003 | Shpak | 455/525 |
| 2003/0207699 A1* | 11/2003 | Shpak | 455/525 |
| 2003/0236103 A1 | 12/2003 | Tamaki et al. | |
| 2004/0051668 A1 | 3/2004 | Chang | |
| 2004/0063455 A1* | 4/2004 | Eran et al. | 455/525 |
| 2004/0121770 A1 | 6/2004 | Tigerstedt | |
| 2004/0141617 A1* | 7/2004 | Volpano | 380/270 |
| 2004/0156399 A1* | 8/2004 | Eran | 370/913 |
| 2004/0183726 A1 | 9/2004 | Theobold | |
| 2004/0185904 A1 | 9/2004 | Yamakita | |
| 2004/0235453 A1 | 11/2004 | Chen et al. | |
| 2005/0054370 A1* | 3/2005 | Shpak | 455/525 |
| 2005/0111405 A1 | 5/2005 | Kanterakis | |
| 2005/0122919 A1 | 6/2005 | Touag | |
| 2005/0135321 A1 | 6/2005 | Sharony | |
| 2005/0152314 A1 | 7/2005 | Sun et al. | |
| 2005/0153713 A1 | 7/2005 | Sharony | |
| 2005/0156794 A1 | 7/2005 | Theobold et al. | |
| 2005/0156799 A1 | 7/2005 | Theobold | |
| 2005/0195110 A1 | 9/2005 | Lin et al. | |
| 2005/0219143 A1 | 10/2005 | Schadler et al. | |
| 2005/0220048 A1 | 10/2005 | Lee et al. | |
| 2005/0238054 A1 | 10/2005 | Sharma | |
| 2005/0261970 A1 | 11/2005 | Vucina et al. | |
| 2006/0002331 A1 | 1/2006 | Bhagwat et al. | |
| 2006/0025127 A1 | 2/2006 | Cromer et al. | |
| 2006/0049987 A1 | 3/2006 | Herrick | |
| 2006/0056443 A1 | 3/2006 | Tao et al. | |
| 2006/0098613 A1 | 5/2006 | Kish et al. | |
| 2006/0111112 A1 | 5/2006 | Maveddat | |
| 2006/0132360 A1 | 6/2006 | Caimi et al. | |
| 2006/0203819 A1 | 9/2006 | Farinacci et al. | |
| 2006/0215691 A1 | 9/2006 | Kobayashi et al. | |
| 2006/0221993 A1 | 10/2006 | Liao et al. | |
| 2006/0281500 A1 | 12/2006 | Huang et al. | |
| 2007/0014267 A1 | 1/2007 | Lam et al. | |
| 2007/0026807 A1 | 2/2007 | Kish | |
| 2007/0081477 A1* | 4/2007 | Jakkahalli et al. | 370/310 |
| 2007/0117514 A1 | 5/2007 | Gainey et al. | |
| 2007/0165610 A1 | 7/2007 | Tseng et al. | |
| 2007/0195725 A1* | 8/2007 | Iino et al. | 370/328 |
| 2007/0213071 A1 | 9/2007 | Hwang | |
| 2008/0014956 A1 | 1/2008 | Balasubramanian | |
| 2008/0102835 A1 | 5/2008 | Zhao et al. | |
| 2008/0112373 A1* | 5/2008 | Shpak | 370/338 |
| 2008/0153497 A1 | 6/2008 | Kalhan | |
| 2008/0165866 A1 | 7/2008 | Teo et al. | |
| 2008/0167093 A1 | 7/2008 | Nagano et al. | |
| 2008/0212535 A1 | 9/2008 | Karaoguz et al. | |
| 2008/0242305 A1 | 10/2008 | Kahlert et al. | |
| 2008/0287130 A1 | 11/2008 | Laroia et al. | |
| 2009/0022127 A1 | 1/2009 | Traynor et al. | |
| 2009/0023434 A1 | 1/2009 | Trainor et al. | |
| 2009/0061873 A1 | 3/2009 | Bao et al. | |
| 2009/0061879 A9 | 3/2009 | Gallagher et al. | |
| 2009/0111472 A1 | 4/2009 | Promenzio | |
| 2009/0252165 A1 | 10/2009 | Zhang et al. | |
| 2010/0080151 A1 | 4/2010 | Proctor et al. | |
| 2011/0040969 A1 | 2/2011 | Yao et al. | |
| 2011/0188484 A1 | 8/2011 | Reznik et al. | |
| 2011/0305217 A1 | 12/2011 | Seok | |
| 2012/0307792 A1 | 12/2012 | Ram et al. | |
| 2012/0314696 A1 | 12/2012 | Liu | |
| 2012/0317619 A1 | 12/2012 | Dattagupta et al. | |
| 2013/0148609 A1 | 6/2013 | Ram et al. | |
| 2013/0188539 A1 | 7/2013 | Han et al. | |
| 2014/0112322 A1 | 4/2014 | Ram et al. | |
| 2014/0126466 A1 | 5/2014 | Hamdi et al. | |

OTHER PUBLICATIONS

Habib et al. "Multi-antenna techniques for OFDM based WLAN." Proceedings of First International Conference on Next-Generation Wireless Systems, Jan. 2006, pp. 186-190.

Kitahara et al. "A base station adaptive antenna for downlink transmission in a DS-CDMA system." IEEE 51st Vehicular Technology Conference Proceedings, 2000 (abstract).

Mahler et al. "Design and optimisation of an antenna array for WiMAX base stations." IEEE/ACES International Conference on Wireless Communications and Applied Computational Electromagnetics, 2005 (abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000 (abstract).

Ponnapalli et al. "Design and packaging of antennas for wireless systems." Proceedings of Electrical Performance of Electrical Packaging, 1995 (abstract).

(56) References Cited

OTHER PUBLICATIONS

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003 (abstract).

IEEE. "Information technology—Telecommunications and information exchange between systems—Local and metropolitan area networks—Specific requirements—Part 11: Wireless LAN Medium Access Control (MAC) and Physical Layer (PHY) specifications." IEEE Std 802.11-1997, Nov. 1997, pp. i-445 (Abstract).

Amir. "Fast handoff for seamless wireless mesh networks." MobiSys '06, Jun. 19-22, 2006, pp. 83-95, ACM, Uppsala, Sweden.

IEEE. "Part 11: Wireless LAN Medium Access Control (MAC) and Physical Layer (PHY) specifications." IEEE Std 802.11-1997, vol. no. pp. i-445, Nov. 18, 1997.

Chen et al. "A seamless handoff mechanism for DHCP-Based IEEE 802.11 WLANS." IEEE Communications Letters, vol. 1, No. 8, Aug. 2007, pp. 665-667.

Cheung et al. "Network configurations for seamless support of CDMA soft handoffs between cell clusters." IEEE Journal on Selected Areas in Communications, vol. 15, No. 7, Sep. 1997, pp. 1276-1288.

Murray et al. "Intelligent access and mobility management in heterogeneous wireless networks using policy." First International Workshop on Information and Communication Technologies, ACM, 2003, pp. 181-186.

Chui et al. "An Access point coordination system for improved VoIP/WLAN handover performance." IEEE 2006, pp. 501-505.

Fan et al. "Managing heterogeneous access networks." 32nd IEEE Conference on Local Computer Networks, IEEE 2007, pp. 651-658.

Huang et al. "Incorporating AP selection and call admission control for seamless handoff procedure." Proceedings of the International Conference on Computer and Communication Engineering 2008, pp. 823-826, 2008.

Huang et al. "SAP: Seamless authentication protocol for vertical handoff in heterogeneous wireless networks." Third International Conference on Quality of Service in Heterogeneous Wired/Wireless Networks, Aug. 7-9, 2006, ACM, Waterloo, ON, Canada, pp. 1-10.

Wei et al. "Seamless handoff support in wireless mesh networks." IEEE 2006, pp. 1-8.

Zhou et al. "A seamless handoff scheme for Mobile IP." IEEE Vehicular Technology Conference, vol. 2, pp. 927-931, 2006.

Manodham et al. "A Seamless handoff scheme with new AP module for wireless LANs support VoIP." Proceedings of the 2005 Symposium on Applications and the Internet. IEEE, 2006, pp. 1-6.

Kist. "Instant handoffs for wireless infrastructure meshed networks," Proceedings of the 2008 Australasian Telecommunication Networks and Applications Conference, pp. 288-293, 2008.

Liao et al. "Practical schemes for smooth MAC layer handoff in 802.11 wireless networks." Proceedings of the 2006 International Symposium on a World of Wireless, Mobile and Multimedia Networks, IEEE, pp. 1-10.

LV. "Intelligent seamless vertical handoff algorithm for the next generation wireless networks." Mobilware '08, Feb. 12-15, 2008, Innsbruck, Austria, pp. 1-10.

Amir. "Fast Handofffor Seamless Wireless Mesh Networks." MobiSys '06, Jun. 19-22, 2006, pp. 83-95, ACM, Uppsala, Sweden.

BusinessWire. "Meru Networks Delivers Industry's Only Zero-Loss Mobility Across WLAN Access Points and IP Subnets." Jun. 21, 2004, pp. 1-2.

Chen et al. "A Seamless Handoff Mechanism for OHCP-Based IEEE 802.11 WLANS." IEEE Communications Letters, Aug. 2007, pp. 665-667, vol. 1, No. 8.

Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.

Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).

Chui et al. "An Access Point Coordination System for Improved VoIP/WLAN Handover Performance." IEEE, 2006, pp. 501-505.

Fan et al. "Managing Heterogeneous Access Networks." 32nd IEEE Conference on Local Computer Networks, 2007, pp. 651-658, IEEE 2007, pp. 651-658.

Finneran. "Can WLAN switches support voice? Today's controllers offer key security and QoS capabilities, but as always, the devil's in the details." Business Communications Review, Oct. 2006, pp. 42-47.

Huang et al. "Incorporating AP Selection and Call Admission Control for Seamless Handoff Procedure." Proceedings of the International Conference on Computer and Communication Engineering 2008, pp. 823-826.

Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.

Hur et al. "A Distributed-Request-Based Diffsery CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.

IEEE Std 802. Nov. 1997 Information Technology—telecommunications and Information exchange between systems—Local and Metropolitan Area Networks—specific Requirements—part 11: Wireless Lan Medium Access Control (MAC) and Physical Layer (PHY) Specifications, IEEE Std 802.11-1997, vol., no., pp. i-445, Nov. 18, 1997.

IEEE. "Part 11: Wireless LAN Medium Access Control (MAC) and Physical Layer (PHY) specifications." IEEE Std. 802.11, 1999 Edition (R2003), 2003, vol. no. pp. i-513.

Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).

Zhou et al. "A Seamless Handoff Scheme for Mobile IP." 2006 IEEE 63rd Vehicular Technology Conference, VTC 2006-Spring, May 7-Jul. 102006, pp. 927-931, IEEE. (Abstract).

Kist. "Instant Handoffs for Wireless Infrastructure Meshed Networks." Proceedings of the 2008 Australasian Telecommunication Networks and Applications Conference, 2008, pp. 288-293.

Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

LV. "Intelligent Seamless Vertical Handoff Algorithm for the Next Generation Wireless Networks." Mobilware '08, Feb. 12-15, 2008, pp. 1-10, Innsbruck, Austria.

Mannion. "Foundry Networks enters WLAN management fray—Bets on integration with wired infrastructure, market timing to take on Cisco." Electronic Engineering Times, Sep. 8, 2003, p. 32, No. 1286.

Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).

Manodham et al. "A Seamless Handoff Scheme with New AP Module for Wireless LANs support VoIP." Proceedings of the 2005 Symposium on Applications and the Internet, 2006, pp. 1-6, IEEE.

Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.

Murray et al. "Intelligent Access and Mobility Management in Heterogeneous Wireless Networks Using Policy." ACM First International Workshop on Information and Communication Technologies, 2003, pp. 181-186.

Rist et al. "Wireless LANs—Look, Ma. . . . No Wires—Wireless networking products prove they are finally ready for prime time." Internetweek, Mar. 20, 2000, p. 41, No. 805, CMP Media, Inc.

(56) References Cited

OTHER PUBLICATIONS

Sattari et al. "Seamless Handover Between WLAN and UMTS." 2004 IEEE 59th Vehicular Technology Conference, VTC2004-Spring: Towards a Global Wireless World, May 17-19, 2004, pp. 3035-3038, IEEE. (Abstract).

Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).

Wei et al. "Seamless Handoff Support in Wireless Mesh Networks." 2006, pp. 1-8, IEEE.

Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).

Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.

Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).

Zhou et al. A Seamless Handoff Scheme for Mobile IP. IEEE Vehicular Technology Conference, 2006, pp. 927-931, vol. 2.

\* cited by examiner

NETWORK-BASED CONTROL OF STATIONS IN A WIRELESS COMMUNICATION NETWORK

RELATED APPLICATIONS

This application claims priority from the following documents.

U.S. patent application Ser. No. 11/298,864, filed Dec. 9, 2005 in the name of inventors Vaduvur BHARGHAVAN et al., titled "Seamless Mobility in Wireless Networks".

U.S. patent application Ser. No. 11/715,287, filed Mar. 7, 2007 in the name of inventors Vaduvur BHARGHAVAN et al., titled "Seamless Mobility in Wireless Networks".

Each of these documents is hereby incorporated by reference as if fully set forth herein. These documents are herein sometimes referred to as the "Incorporated Documents".

BACKGROUND

Wireless communication systems include mobile stations (MS's), which communicate with access points (AP's), which collectively communicate using wireless and wired techniques. In a wireless communication system operating using an IEEE 802.11 protocol, or variant thereof, each access point controls wireless communication with those mobile stations in a localized communication region (also known as a "cell"). Mobile stations operating according to an IEEE 802.11 protocol, or variant thereof, attempt to determine in which cell they are operating, and attempt to communicate with the particular access point for that cell.

SUMMARY OF THE DESCRIPTION

Using the feature named "KEY_SEARCH_AD1" in the Atheros 11n chipset, an access point can determine whether to send an ACK packet in response to a message packet in response to whether the BSSID present in the receiver address (not the sender address) is present in the keycache. This has the effect that the access point can maintain a list of about 128 arbitrarily selected BSSID's, to each of which it will respond with an ACK packet if it receives a message from a mobile station addressed to that BSSID. (Effectively, each of the access point's BSSID's represents a method for mobile stations to access the AP; this has the effect that BSSID's could be considered either addresses for AP's or addresses for services offered by AP's.) This has two effects: (1) the number of mobile stations that can be assigned to that AP is relatively greater, and (2) the selection of those BSSID's is no longer constrained by having to match the access point's BSSID using a mask. With selection of those BSSID's being no longer so constrained, it is easier to assign BSSID's for use by mobile stations while allowing those mobile stations to roam among multiple access points.

DETAILED DESCRIPTION

Overview

In systems described in the Incorporated Documents, handoff and other functions of wireless communication systems are controlled by access points, themselves under direction of a control element, rather than by the mobile stations seeking out and communicating with access points. The Incorporated Documents describe at least two techniques, "virtual cells" and "personal access points", and their advantages, including for example roaming among access points without the mobile station having to conduct handoff operations.

In systems using virtual cells, mobile stations are all associated with a common BSSID they might access, which is shared among substantially all of the access points. In such cases, the control element selects one or more access points (typically one at any particular time) to communicate with the mobile station; those one or more access points are the only access points which respond to message packets from the mobile station.

In systems using personal access points, mobile stations are each associated with a unique BSSID they might access, which is associated with the particular one or more access points the system associates with that particular mobile station. In such cases, the mobile station's unique BSSID access ability is moved from one to another access point as it is desired to re-assign the mobile station; the one or more access points maintaining that unique BSSID (typically one at any particular time) are the only access points which respond to message packets from the mobile station.

In one vendor's implementation of access points in the IEEE 802.11n protocol, including at least the Atheros model AR5416 and the Atheros model AR9160 (and of course any other devices having this or a similar capability, whether or not from the same vendor), access points include a feature named "KEY_SEARCH_AD1", which when enabled provides that the access point, when responding with an acknowledgement (ACK) packet to a message from a mobile station, will match the receiver (i.e., not sender) address of the incoming packet against an entry in a locally maintained table of mobile station address (the "keycache"). For each entry in the keycache, a separate register controls whether the access point will provide ACK packets in response to an address match on that entry.

When the mobile station sends a message packet to the access point, the sender address for that packet is the MAC address associated with the mobile station, and the receiver address is the BSSID for the access point. This has the effect that, if the access point determines whether to send an ACK packet in response to a message packet, it must do so in response to whether its own BSSID is present in the receiver address. In contrast, when an access point sends a message to a mobile station, the sender address for that packet is the BSSID for which the mobile station has been assigned the capability of access, and the receiver address for that packet is the MAC address for the mobile station.

In many implementations of the IEEE 802.11n protocol, the access point can also mask some of the bits of its BSSID. This has the effect that the access point can respond to multiple BSSID's, but the number of possibilities is limited by the ability to maintain unique BSSID's that still match the access point's own BSSID after masking. Mobile stations can thus be assigned the ability to access BSSID's that match the access point's own BSSID after masking, but the number of such BSSID's would be relatively limited. In systems using personal access points, this has the effect of limiting the number of mobile stations that can be assigned to the access point, as well as constraining the BSSID's that can be accessible by mobile stations while allowing those mobile stations to roam among multiple access points.

When using the feature named "KEY_SEARCH_AD1", the access point can determine whether to send an ACK packet in response to a message packet in response to whether the BSSID present in the receiver address is present in the keycache. This has the effect that the access point can maintain a list of about 128 arbitrarily selected BSSID's, to each of which it will respond with an ACK packet if it receives a message from a mobile station assigned to that BSSID. This has two effects: (1) the number of mobile stations that can be assigned to that access point is relatively greater, and (2) the selection of those BSSID's is no longer constrained by having to match the access point's BSSID using a mask. With selection of those BSSID's being no longer so constrained, it is easier to assign BSSID's for access by mobile stations while allowing those mobile stations to roam among multiple access points.

FIGURES AND TEXT

FIG. 1

FIG. 1 shows a block diagram of a system according to this application.

A wireless communication system 100 includes a control element 110, a set of access points 120, and a set of mobile stations 130.

Each access point 120 includes registers maintaining its own AP BSSID 121, a "KEY_SEARCH_AD1 enabled" bit 122, and a keycache 123. The keycache 123 includes approximately 128 keycache registers 124, each including a MAC address associated with a mobile station 130. Each mobile station 130 includes a register maintaining its own MAC address 131.

Mobile stations 130 send message packets 132 wirelessly, those message packets 132 each including a sender address 133 and a receiver address 134. Each access point 120 is disposed for receiving those message packets 132. In operation, when an access point 120 receives a message packet 132, it uses the KEY_SEARCH_AD1 feature to determine whether to respond with an ACK packet 125. This has the effect that the access point 120 compares the receiver address 134 of the message packet 132 with its keycache registers 124. The access point 120 responds with an ACK packet 125 if and only if that receiver address 134 matches one of those keycache registers 124; otherwise it does not respond with an ACK packet 125.

In operation, the access point 120 is directed by the control element 110 to insert a BSSID to be accessible by a selected mobile station 130 into its keycache 123 when the control element 110 assigns that particular mobile station 130 to that access point 120. Similarly, the access point 120 is directed by the control element 110 to delete a BSSID previously accessible by a selected mobile station 130 from its keycache 123 when the control element 110 de-assigns that particular mobile station 130 from that access point 120.

FIGS. 2 AND 3

One problem with the "KEY_SEARCH_AD1" feature is that current implementations by the Atheros model AR5416 and the Atheros model AR9160 access points 120 erroneously treat recovery from failed transmissions of message packets (sometimes known as "multiple retries"). More specifically, in proper operation, when a device, whether an access point 120 or otherwise, sends a unicast message packet, it should wait a designated duration of time for an ACK packet 125. If no ACK packet 125 arrives within that designated duration of time, the device resends the message packet, until a matching ACK packet 125 arrives or a maximum designated number of retries have been attempted. In many cases, the data-rate for transmission of the retried message packets is different, typically decreasing with each retry, with the effect that the chance of successful transmission is increased with each retry.

In current implementations by (at least) the Atheros model AR5416 and the Atheros model AR9160 access points 120, it is possible for software controlling the access point to designate a set of parameters for the access point 120 to use when attempting multiple retries. More specifically, that set of parameters might specify the maximum number of retries and the data-rate for each such retry. In such cases, when the access point 120 is ready to transmit a message packet, it should transmit the message packet and await an ACK packet 125 according to the designated set of parameters. If the access point 120 does not receive an ACK packet 125 within the designated duration of time for an ACK packet 125, it should retry transmission, according to the designated set of parameters, until either an ACK packet 125 is received or the designated maximum number of retries is reached. If an ACK packet 125 is ultimately received, the access point 120 should return a status code to the controlling software indicating successful transmission, while if no ACK packet 125 is received after the designated maximum number of retries is reached, the access point 120 should return a status code to the controlling software indicating failure of the transmission.

However, in current implementations by (at least) the Atheros model AR5416 and the Atheros model AR9160 access points 120, when the "KEY_SEARCH_AD1" feature is set. In such cases, the access point 120 fails to match received ACK packets 125 to those transmitted message packets. This has the effect that the access point 120 will fail to recognize receipt of any ACK packets 125; the access point 120 will therefore retry the message packet until the designated maximum number of retries is reached, and therefore always return a status code to the controlling software indicating failure of the transmission.

Accordingly, in one embodiment, software performs matching of transmitted message packets and received ACK packets 125.

Figure 1:
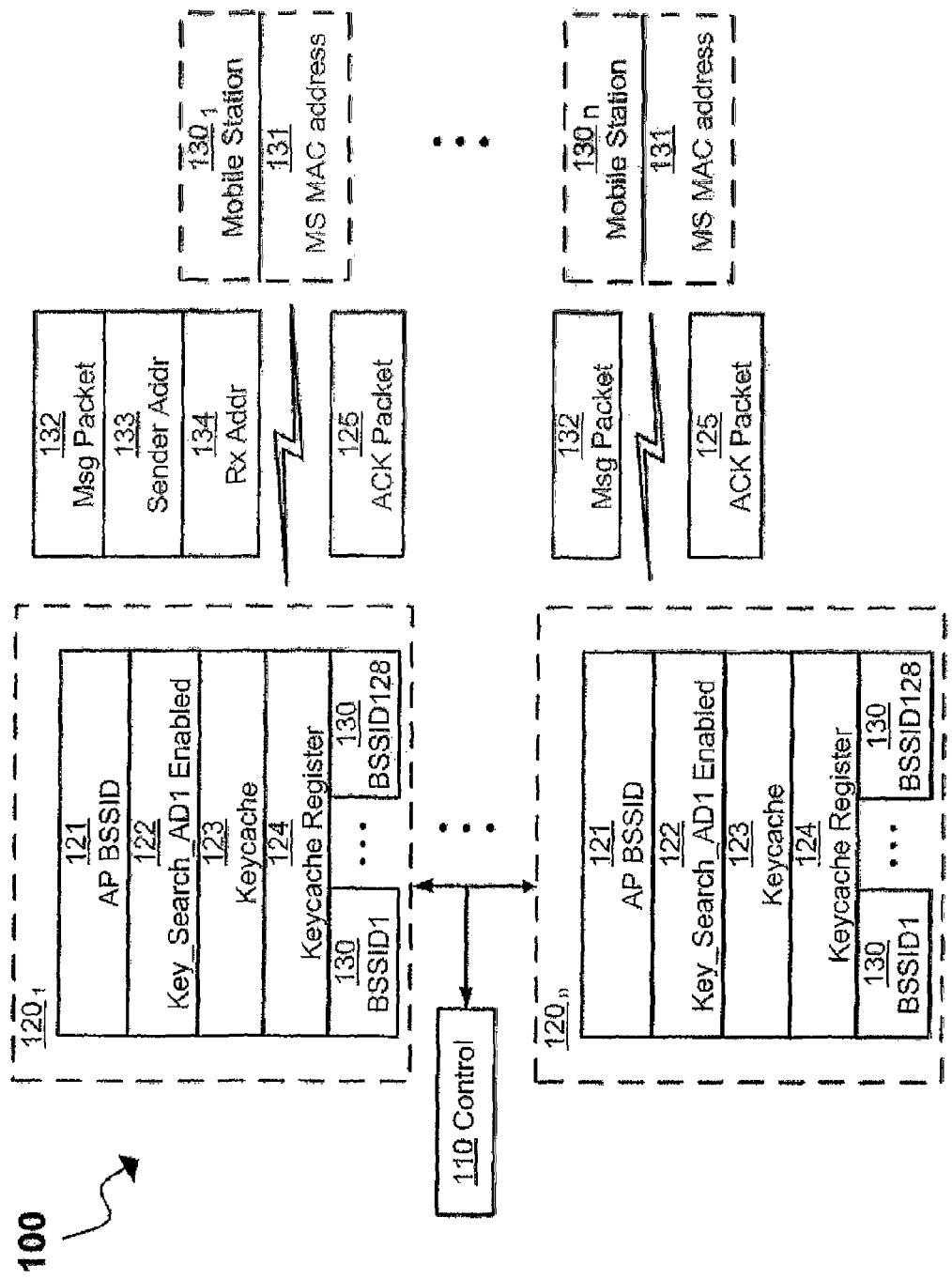
Figure 2:
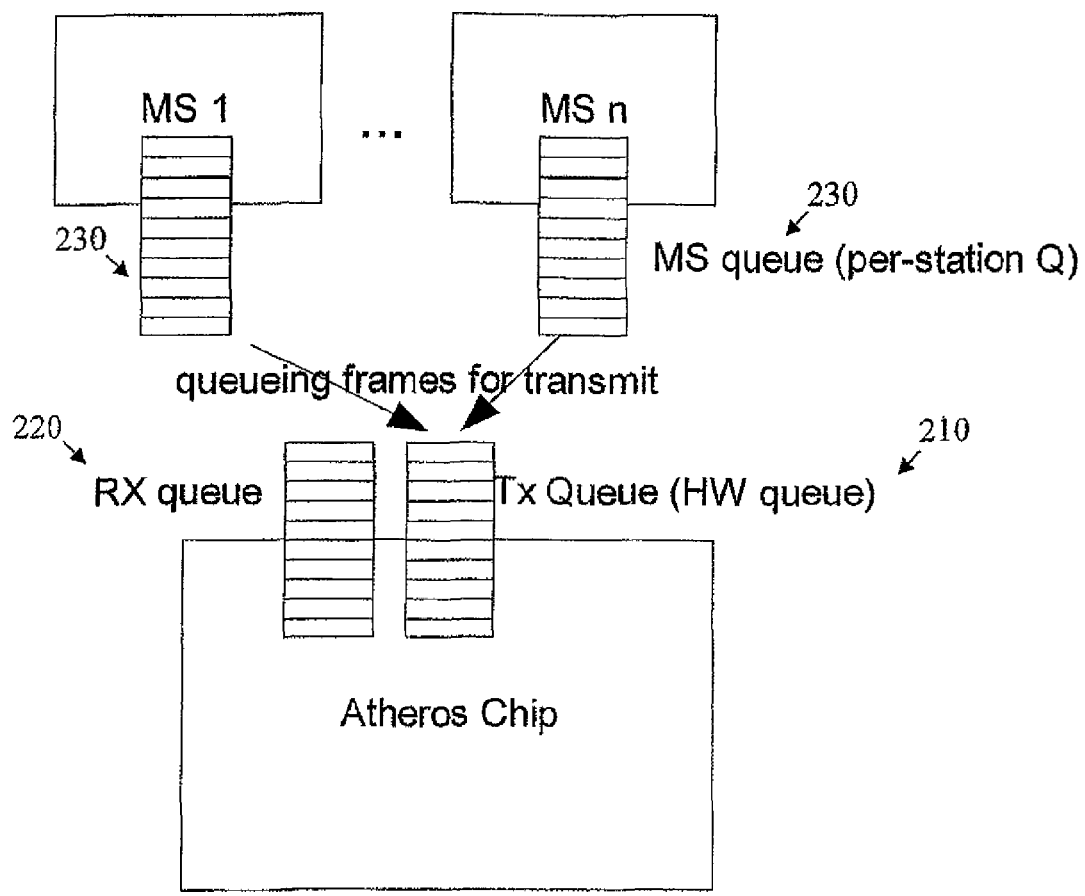
FIG. 2 shows a block diagram of a software ACK system according to this application.

In the FIG. 2, the access point 120 includes a hardware transmit queue 210, a receive queue 220, and for each mobile station 130, a mobile station queue 230.

Figure 3:
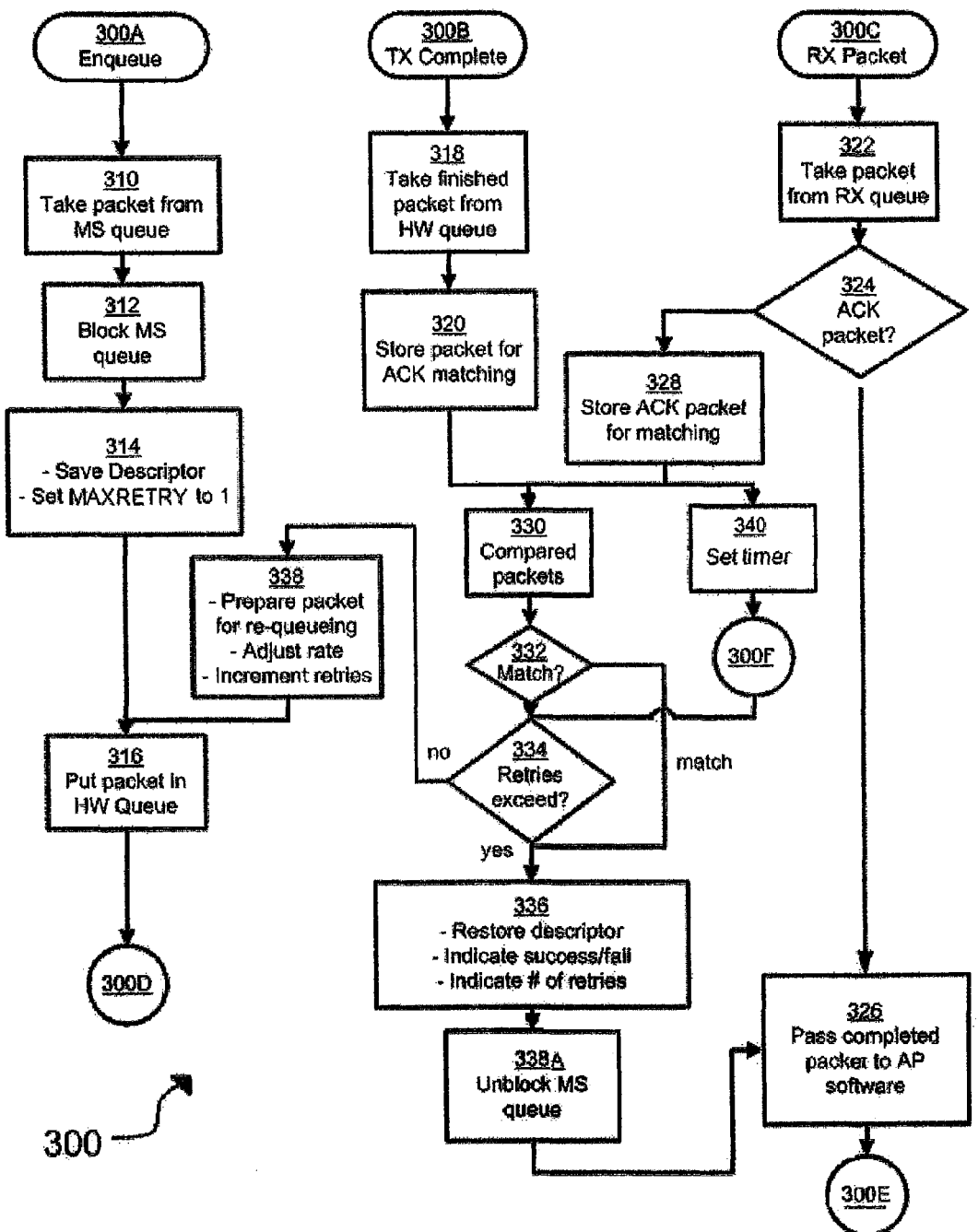
FIG. 3 shows a process flow diagram of a software ACK method according to this application.

A method 300 includes a set of flow labels and method steps as shown in the FIG. 3, including at least the following.

BEGINNING OF METHOD

Reaching the flow label 300A indicates the beginning of the method.

At a method step 310 a packet is removed from the mobile station queue followed by a method step 312 wherein the MS queue is blocked preventing further queuing.

At a method step 314 the original packet descriptor is saved for later recall and setting the MAXRETRY parameter of the packet to 1 for providing only a subset of possible retries for the transmission.

The method step 316 provides for placing the modified packet (the TX packet) with the hardware (HW) queue for transmission reaching the flow label 300D.

Reaching a flow label 300B indicates the TX packet transmission is complete.

At a method step 318 the TX packet is removed from the HW queue and at a method step 320 provides for storing the TX packet for later ACK matching. Reaching a method step 340 wherein a timer is set or timing indication is recorded. Upon completion of a timing indication, if a packet has not been received, then at a method label 300F reaching a timeout wherein operation transfers to a method step 334.

Reaching the flow label 300C indicates reception of an RX packet.

At a method step 322 the RX packet is removed from the received queue and tested in a method step 324. If the RX packet is not a complementary packet such as an ACK packet, the packet is passed unchanged to the access point (AP) software in a method step 326 thus reaching the end of the method at flow label 300E.

If the determination in the method step 324 is that the RX packet is a complementary packet such as an ACK packet, the ACK packet is stored for later matching in the method step 328.

A method step 330 provides for comparing the RX packet stored in the method step 328 with the TX packet stored in the method step 320 wherein the two packets are compared to determine if the RX packet is a complementary packet corresponding to the TX packet.

The method step 332 provides for the determination of a match wherein if there is a match, operation proceeds from the method step 336. If there is not a match, operation moves to a method step 334 wherein the number of retries is compared to a predetermined retry limit. If the retry limit is exceeded, operation proceeds to a method step 336. If the retry limit is not exceeded, operation proceeds to the method step 338.

At a method step 338 the TX packet is prepared for requeuing. This may include adjusting one or more transmission parameters, such as the transmission rate, to provide for more reliable communications with a mobile station. A method step 338 provides for incrementing a retry counter associated with the packet under consideration. When the method step 338 is completed, operation moves to a method step 316 for further transmission according to the foregoing description.

Returning to the method step 334, if the retry limit is found to be exceeded, operation moves to the method step 336. In the method step 336, the original descriptor from the method step 314 is restored to the packet. A flag indicating transmission success or failure is set, said flag indication being based on a comparison between the number of retries and a predetermined amount. The number of retries is associated with the packet before operation moves to a method step 338a.

The method step 338a unblocks the MS queue that has been previously blocked in the method step 312 thus allowing for system operation involving future packets. Operation then moves to the method step 326 wherein the packet is passed to the access point.

The method 300 terminates at the flow label 300E.

END OF METHOD

In one embodiment, the method 300 is repeated continually by the wireless communication system for each message packet to be transmitted.

To prevent re-ordering of message packets, the method 300 requires that only one frame per mobile station 130 is allowed to be enqueued at the hardware transmit queue 210 from the mobile station queue 230 for that mobile station 130. Accordingly, upon moving a message packet from the mobile station queue 230 for that mobile station 130, the method 300 requires the mobile station queue 230 for that mobile station 130 to wait for successful transmission of that message packet before attempting to move a further message packet from the mobile station queue 230 for that mobile station 130 onto the hardware transmit queue 210 for the access point 120.

ALTERNATIVE EMBODIMENTS

After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. A computer-implemented method in an access point of a plurality of access points managed by a controller of a wireless communication network, the method for utilizing BSSIDs (basic service set identifiers) to maintain individual control of stations that communicate using a protocol inherent to the stations, the method comprising the steps of:

storing, in the access point, a BSSID assigned to the access point by the controller;

storing, in the access point, a plurality of persistent, uniquely-assigned BSSIDs, each persistent, uniquely-assigned BSSID being individually assigned to each station by the controller responsive to stations assigned to the access point for servicing, wherein uniqueness of the BSSID allows the controller to individually manage stations, and wherein persistence of the BSSID allows the controller to maintain individual control over each station after moving to a second access point of the plurality of access points from the access point, wherein each persistent, uniquely-assigned BSSID is stored at both a station and the access point, each of the plurality of access points independently using layer 2 communications, and each persistent, uniquely-assigned BSSID configured in the station by the access point with a beacon frame or a probe response frame sent from the access point to the mobile station;

receiving a message frame from a station, the modified message frame comprising a receiver address defined by the persistent, uniquely-assigned BSSID and a sender address defined by a MAC address unique to the station;

determining whether to send an ACK frame to the station, the ACK frame comprising a receiver address defined by the unique MAC address of the mobile station and a sender address defined by the persistent, uniquely-assigned BSSID of the station, the determination comprising comparing the receiver address of the received modified message frame to one of the stored plurality of persistent, uniquely assigned BSSIDs; and responsive to matching the receiver address of the received modified message frame to one of the stored plurality of persistent, uniquely-assigned BSSIDs, generating the ACK frame indicative of a successful transmission.

2. The method of claim 1, further comprising:
enabling a key search bit, wherein matching the persistent, uniquely-assigned BSSID to one of the stored plurality of persistent, uniquely assigned BSSIDs is responsive to the enabled key search bit.

3. The method of claim 1, further comprising:
disabling a key search bit; and
responsive the disabled key search bit, matching the receiver address of the received modified message frame to the plurality of persistent, uniquely-assigned BSSIDs.

4. The method of claim 1, further comprising:
disabling a key search bit;
responsive the disabled key search bit, sending an unmodified message frame to the station rather than a modified message frame, the unmodified message frame comprising the sender address defined by the persistent, uniquely-assigned BSSID and the receiver address defined by the mobile station MAC address; and
responsive the disabled key search bit, matching the sender address of the received ACK frame to the plurality of persistent, uniquely-assigned BSSIDs.

5. The method of claim 1, wherein storing the plurality of BSSIDs comprises:
    storing the plurality of persistent, uniquely-assigned BSSIDs in a key cache integrated within a processor of the access point.
6. The method of claim 5, wherein the key cache comprises a plurality of registers, each register storing one of the plurality of persistent, uniquely-assigned BSSIDs.
7. The method of claim 1, wherein the persistent, uniquely-assigned BSSID cannot be identified by masking one of the plurality of persistent, uniquely-assigned BSSIDs.
8. The method of claim 1, further comprising:
    storing the persistent, uniquely-assigned BSSID based on the controller assigning the station to the access point among a plurality of access points being controlled.
9. The method of claim 1, further comprising:
    deleting the persistent, uniquely-assigned BSSID based on a controller de-assigning the station to the access point among a plurality of access points being controlled.
10. A non-transitory computer readable medium storing a computer program product to perform a method in an access point of a plurality of access points managed by a controller of a wireless communication network, the method for utilizing BSSIDs (basic service set identifiers) to maintain individual control of stations that communicate using a protocol inherent to the stations, the method comprising the steps of:
    storing, in the access point, a BSSID assigned to the access point by the controller;
    storing, in the access point, a plurality of persistent, uniquely-assigned BSSIDs, each persistent, uniquely-assigned BSSID being individually assigned to each station by the controller responsive to stations assigned to the access point for servicing, wherein uniqueness of the BSSID allows the controller to individually manage stations, and wherein persistence of the BSSID allows the controller to maintain individual control over each station after moving to a second access point of the plurality of access points from the access point, wherein each persistent, uniquely-assigned BSSID is stored at both a station and the access point, each of the plurality of access points independently using layer 2 communications, and each persistent, uniquely-assigned BSSID configured in the station by the access point with a beacon frame or a probe response frame sent from the access point to the mobile station;
    receiving a message frame from a station, the modified message frame comprising a receiver address defined by the persistent, uniquely-assigned BSSID and a sender address defined by a MAC address unique to the station;
    determining whether to send an ACK frame to the station, the ACK frame comprising a receiver address defined by the unique MAC address of the mobile station and a sender address defined by the persistent, uniquely-assigned BSSID of the station, the determination comprising comparing the receiver address of the received modified message frame to one of the stored plurality of persistent, uniquely assigned BSSIDs; and
    responsive to matching the receiver address of the received modified message frame to one of the stored plurality of persistent, uniquely-assigned BSSIDs, generating the ACK frame indicative of a successful transmission.

11. An access point of a system including a plurality of access points managed by a controller of a wireless communication network, the system to utilize BSSIDs (basic service set identifiers) to maintain individual control of stations that communicate using a protocol inherent to the stations, the access point comprising:
    a register to store a BSSID assigned to the access point by the controller, the register to internally store a plurality of persistent, unique-assigned BSSIDs, each uniquely-assigned BSSID being individually assigned to each station by the controller responsive to stations assigned to the access point for servicing, wherein uniqueness of the BSSID allows the controller to individually manage stations, and wherein persistence of the BSSID allows the controller to maintain individual control over each station after moving to a second access point of the plurality of access points from the access point, wherein each persistent, uniquely-assigned BSSID is stored at both a station and the access point, each of the plurality of access points independently using layer 2 communications, and each persistent, uniquely-assigned BSSID configured in the station by the access point with a beacon frame or a probe response frame sent from the access point to the mobile station; and
    an interface, coupled in communication with the register and the processor, to receive a modified message frame from a station, the modified message frame comprising a receiver address defined by the persistent, uniquely-assigned BSSID and a sender address defined by a MAC address unique to the station;
    a processor to determine whether to send an ACK frame to the station, the ACK frame comprising a receiver address defined by the unique MAC address of the mobile station and a sender address defined by the persistent, uniquely-assigned BSSID of the station, the determination comprising comparing the receiver address of the received modified message frame to one of the stored plurality of persistent, uniquely assigned BSSIDs and responsive to matching the receiver address of the received modified message frame to one of the stored plurality of persistent, uniquely-assigned BSSIDs, generating the ACK frame indicative of a successful transmission.

* * * * *